2,861,473

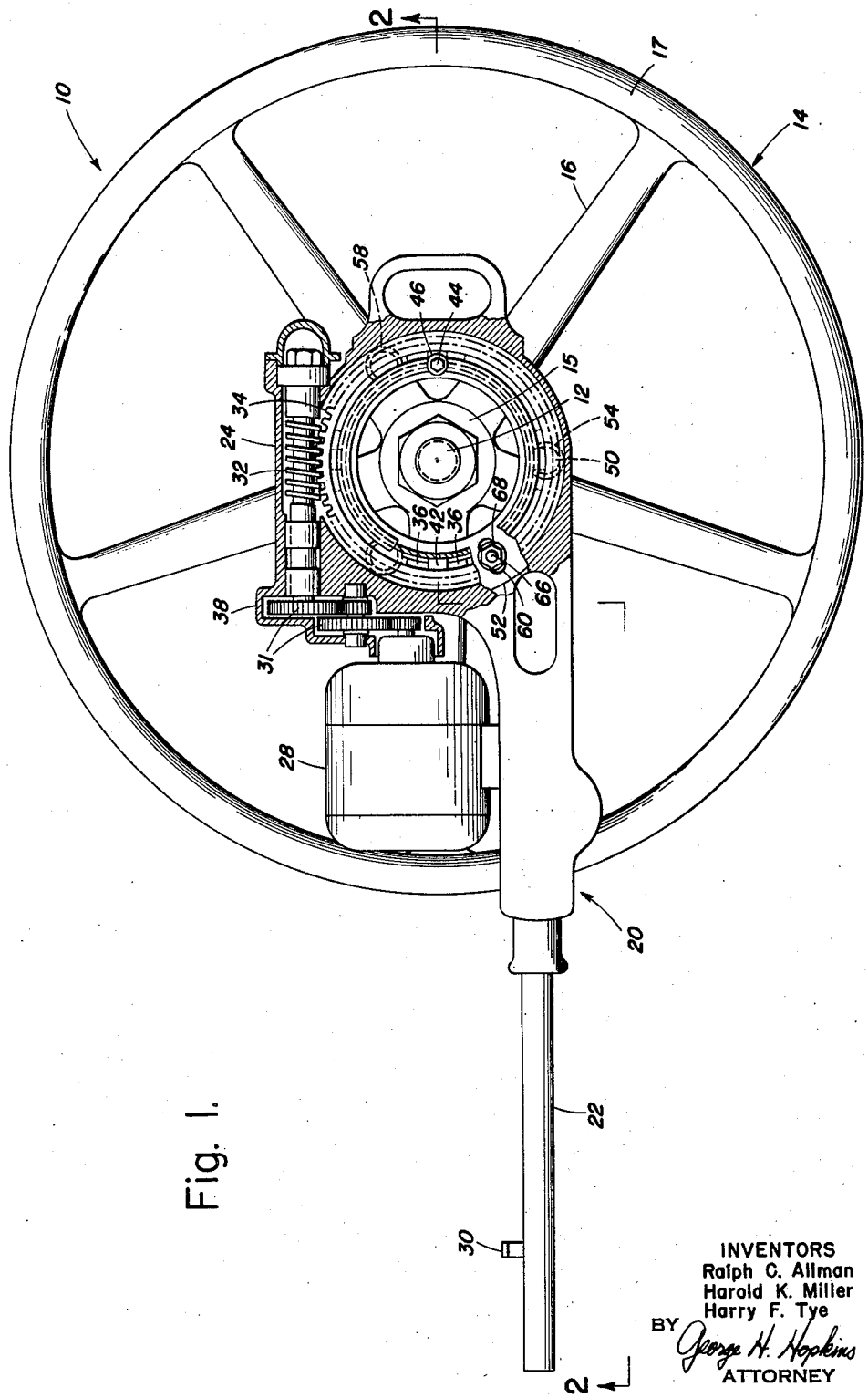
Fig. I.
INVENTORS
Ralph C. Allman
Harold K. Miller
Harry F. Tye
BY George H. Hopkins
ATTORNEY Nov. 25, 1958
R. C. ALLMAN ET AL
2,861,473
PORTABLE VALVE OPERATOR
Filed Feb. 28, 1957
2 Sheets-Sheet 2
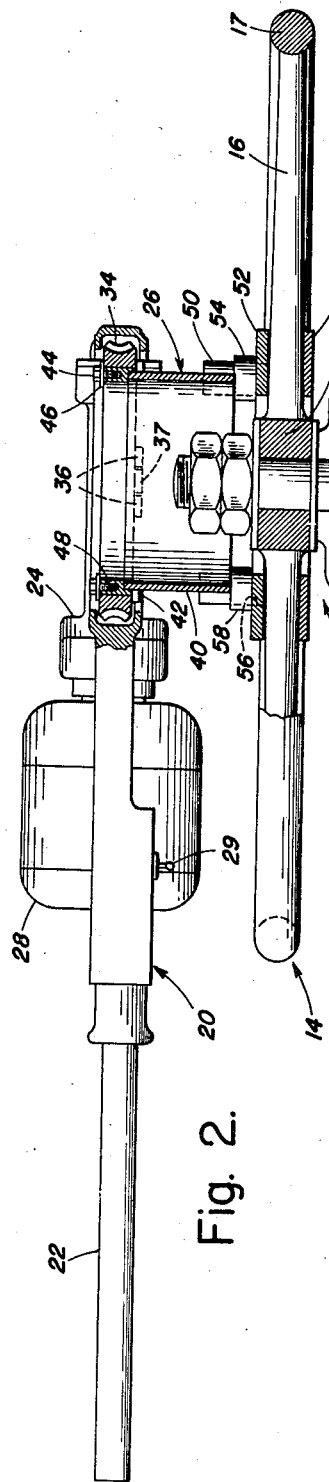
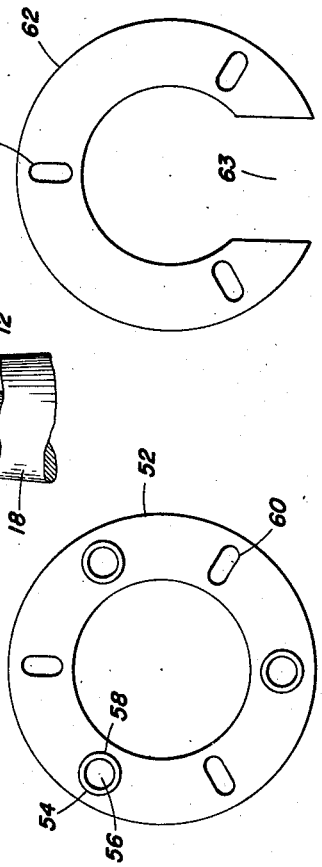
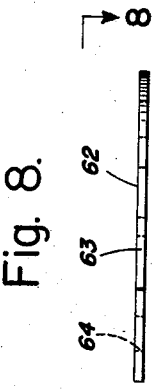
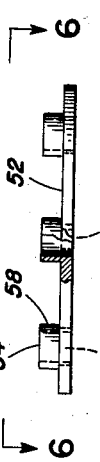
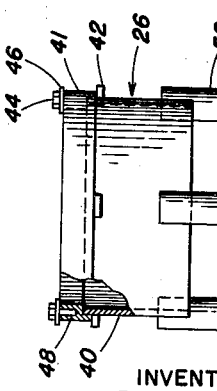
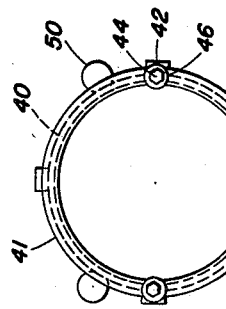
INVENTORS
Ralph C. Allman
Harold K. Miller
Harry F. Tye
BY
George H. Hopkins
ATTORNEY United States Patent Office 2,861,473
Patented Nov. 25, 1958

PORTABLE VALVE OPERATOR

Ralph C. Allman, Ecorse Township, Harold K. Miller, Grosse Ile, and Harry F. Tye, Allen Park, Mich., assignors to Wyandotte Chemicals Corporation, Wyandotte, Michigan, a corporation of Michigan Application February 28, 1957, Serial No. 643,135

2 Claims. (Cl. 74—625)

This invention relates to a portable valve operator. More particularly, it relates to an apparatus for operating hand wheels on valve structures.

As pointed out in U. S. patent, No. 2,709,062, to J. Lamb, the manual operation of hand wheel valves can quite frequently be a tedious, inefficient, and time-consuming task. Accordingly, it has been a problem to find ways and means to provide power operation for valves by means of a portable power unit which can readily be applied to the drive element of a selected valve for effecting movement of the valve member between open and closed position. The Lamb valve operator is a decided contribution towards the solution of this problem. However, it will be noted that the Lamb valve operator requires a number of auxiliary elements attached to each valve, the most essential of which is the bevel gear 8. This is a disadvantage since every valve must be equipped with a bevel gear.

It is therefore an object of this invention to provide the art with a portable valve operator which requires a minimum of auxiliary and supplementary attachments to the valve. More specifically, it is an object of this invention to provide the art with a portable valve operator containing substantially all of the necessary means for actuating the hand wheel of manually operated valves, including the gear means.

These and other objects that may appear as this specification proceeds are achieved by this invention.

In summary this invention comprises a portable valve operator having a lever arm and, mounted at one end thereof, a rotatable gear with means attached to said lever arm for rotating said gear. The gear is adapted with means to transmit torque to hand wheels. Said torque transmission means are so constructed as to enable the application of torque directly to hand wheels in the as-is condition. It is preferred, however, to equip each valve hand wheel with a readily installable auxiliary adapter which comprises means that cooperate with said torque transmission means and receive torque therefrom for the hand wheel.

A preferred embodiment of this invention comprises a lever arm, at one end of which is a casing housing a rotatable ring gear, and means such as an electric motor associated with a gear train for rotating said gear at a rapid rate. The casing and ring gear are adapted with a coaxially aligned opening for the passage therethrough, under operative conditions, of a spindle or valve stem in the case of a rising stem-type valve. Attached to said ring gear is a torque transmission assembly which comprises a metallic cylinder adapted to rotate with said ring gear and a set of engaging rod members. The length of this cylinder is not critical except that it should be long enough to prevent the engaging rod member which may be located on the outside of periphery thereof from grinding against the ring gear casing under operative conditions. The engaging rod members are located parallel to the axis of the cylinder and are of length sufficient to extend to the hub level of even those valve hand wheels where the hand wheel rim is located at a higher level than the hub. The engaging rod members may be disposed about the periphery of the cylinder in such a manner as to contact the hand wheel spokes under operative conditions.

It is preferred, however, to equip the hand wheel with an auxiliary adapter which comprises receptacles arranged and adapted to receive the engaging rod members of the torque transmission assembly. The dimensions of the engaging rod members and of the engaging rod receptacles are preferably selected to adequate support the valve operator in position without manual aid. The auxiliary adapter may be made a member of the hand wheel at the time of its manufacture, or, the adapter may be attached to already installed hand wheels. In the preferred embodiment the auxiliary adapter comprises a circular plate with an opening in the center thereof for the passage therethrough of a valve stem where a rising valve stem is involved, which plate is adapted to be disposed on the top side of the hand wheel, engaging rod receptacles affixed to said plate, and means for affixing said plate to said hand wheel. Such means may comprise a plate, preferably U-shaped in plan view to accommodate the hub portion of valve wheels, which is adapted to be located on the bottom side of the hand wheel adjacent the hub, with machine bolts passing through aligned bolt holes in both the top and bottom plates and nuts thereon clamping the plates together on the hand wheel.

The power means for rotating the ring gear of the valve operator may comprise a motor driven by compressed air. It may instead comprise an electrical motor. In either case it is desirable that means be provided for reversing the direction of spin of the motor so that the valve can be both opened and closed without moving the valve operator. On the other hand it is within the scope of this invention to construct the valve operator with torque transmission means on both sides of the ring gear wherefore, instead of, or in addition to, the reversing switch, the valve operator can be merely flipped over when it is desired to reverse the direction of turning of the valve. However, for safety reasons and reasons of convenience, a reversing switch alone will usually be the most desirable. Of course, a start-stop switch associated with either the pressurized air line or electric line, as the case may be, is also highly desirable.

The portable valve operator of this invention is an improvement on the Lamb valve operator in that the gear means is located in the valve operator and not on the valve. With this invention it is no longer necessary to adapt each hand wheel with a bevel gear and the like, wherefore substantial savings are effected in the use of this invention.

Still another advantage of this invention is that the lever arm permits manual operation of the valve where only a few turns of the valve are needed. It likewise permits manual operation in addition to powered operation when a fully closed or open valve has become stuck. In short, the valve operator of this invention is an extremely versatile tool.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

Turning now to the drawings, it will be observed that Fig. 1 is a plan view of a preferred embodiment of the portable valve operator of this invention, which is shown in association with a valve hand wheel and with portions of the casing and structure of the portable valve operator torn away to reveal underlying structural elements;

Fig. 2 is a side sectional view of the complete portable valve operator and valve taken along line 2—2 of Fig. 1;

Fig. 3 is a side view of the torque transmission means with a portion of the structure torn away to reveal a sectional view of the ring gear engaging section thereof;

Fig. 4 is a plan view of the torque transmission means of Fig. 3;

Fig. 5 is a side view of the auxiliary adapter with a portion of the structure removed to show the interior design and construction of the adapter;

Fig. 6 is a plan view of the auxiliary adapter of Fig. 5;

Fig. 7 is a side view of a bottom hand wheel plate used to attach the auxiliary adapter of Fig. 5 to the hand wheel; and Fig. 8 is a plan view of the bottom hand wheel plate, which is taken along the lines 8—8 of Fig. 7.

In somewhat more detail, there is shown in the drawings a nonrising stem type, rotatable hand wheel valve 10 with a vertically disposed valve stem 12 at the bottom of which is the valve body (not shown) and at the top of which is mounted and attached thereto a hand wheel 14 comprising a hub 15, hand wheel spokes 16, and circular hand wheel rim 17. Below the hand wheel the valve stem is housed in a casing 18.

Mounted on the hand wheel 14 is a portable valve operator 20 which comprises a lever arm 22 at one end of which are means for supplying torque to a torque transmission means 26 adjacent said end of the lever arm. In the embodiment shown, the torque supplying means comprises a power unit 24 which comprises an electric motor 28 associated with a reversing switch 29 for reversing the direction of rotation of the motor and an on-off switch 30. Both switches are mounted on the lever arm 22 at places or positions of convenience. Associated with the motor is a gear train with gears 31 which turn a worm 32 associated with a worm gear or ring gear 34. The gears 31, worm 32 and the gear teeth of the ring gear 34 are encased in a housing 38, the housing above and below the ring gear extending inwardly towards the axis of the ring gear just sufficiently to cover the means for retaining the gear ring 34 in place and the gear teeth projecting outwardly from the rim of the ring gear 34. Such retaining means, such as a rim track and roller bearing assembly, are conventional and, to simplify the drawing, are not shown. The region above and below the ring gear from the axis thereof to the portion of the rim adjacent the gear teeth is open as well as the inside of the ring gear, in order to permit the rise and fall of valve stem when the valve operator is applied to rising stem valves and in order to accommodate the torque transmission means 26.

Ring gear 34 is here shown as being provided with downwardly projecting lug members 36. These downwardly projecting lug members occur in pairs and the pairs are spaced at equal distances from one another, the lugs in each pair being spacedly set apart from one another to form thereby retaining slots 37. At least one pair of lug members should be provided, and in the drawings four pairs are indicated.

The torque transmission means 26 comprises a rigid cylinder 40 having a ring member 41 at the upper portion thereof, which has an outside diameter approximately equal to the inside diameter of the ring gear 34 but sufficiently less so that the ring member will fit adjacent the inside periphery of the ring gear. Also, projecting outwardly and radially from the upper portion of the cylinder 40 are lug members 42, which lugs are preferably spaced equidistantly from one another and adapted to fit into the retaining slots 37 to contact the ring gear lug members 36. At least one lug member 42 is required while in the drawing four are indicated. The torque transmission means 26 is attached to the ring gear 34 by a pair of machine bolts 44 with associated washers 46 which bolts are screwed into tapped holes 48 disposed in the top surface of ring member 41. The machine bolt head and washer contact the top surface of the ring gear 34 adjacent the gear housing 38 and cooperate with the lug member 42 in clamping the torque transmission means to the ring gear. At least one machine bolt disposed oppositely to the lug member 42 is required. The drawings, however, show two, which are preferred since there is less strain placed in the lug members 42.

Disposed at the bottom of the cylinder 40 are three downwardly projecting engaging rod members 50. At least one of these members is required. These rod members are welded to the outside of the cylinder 40 and are adapted to engage the hand wheel 14, preferably with the aid of an auxiliary adapter which comprises a flat circular plate 52 with a hollow center of size and shape at least to accommodate the passage of a valve stem therethrough and in this case to accommodate the hand wheel hub 15. The auxiliary adapter is provided with engaging rod receptacle members 54 each of which has a hole 56 formed as by a vertically disposed cylinder 58 welded to the plate, which hole is adapted and arranged to receive in close fit a corresponding engaging rod member 50. The circular plate 52, resting on the hand wheel spokes 16 adjacent the hub 15 is clamped to the spokes by means which comprise another flat circular plate 62 having a hollow center of size and shape corresponding to the circular plate 52. Preferably the plate 62 is U shaped in plan view to provide an opening 63 so that the plate can be positioned adjacent the hand wheel without removal of the hand wheel from the valve stem. Both plates are provided with slots 60 and 64 which are in alignment and which accommodate carriage bolts 66. Nuts 68 on said carriage bolts are in tightened position whereby the auxiliary adapter is securely attached to the hand wheel.

To operate the portable valve operator 20, the on-off switch 30 is turned on to supply power to the motor 28. As the motor turns, the gears 31 are actuated, the worm 32 is turned and the ring gear 34 is rotated, thereby turning the torque transmission means 26 which transmit torque through the auxiliary adapter to the hand wheel 14. When the hand wheel has been turned to the desired degree the on-off switch is turned off. To turn the hand wheel in the opposite direction, the reversing switch 29 is flipped and the on-off switch 30 is then turned on.

In view of the worm 32, which tends to block movement of the ring gear 34 when the power unit is turned off, the portable valve operator 20 can also be used to manually turn the hand wheel 14. This, however, is of practical advantage when only a few turns of the hand wheel are desired.

The lever arm assembly without the torque transmission means is available as a commercial pipe threading tool now manufactured by several different companies. In these tools, it will usually be found that the retaining slots 37 are in the form of recessed pockets spaced equidistantly about the lower inside circumference of the ring gear 34. Such an arrangement is preferred over that shown in the drawings because of its greater structural strength. In any event the lugs 42 are adapted to fit within the retaining slots 37.

What is claimed is:

1. An apparatus for use on a flow control valve having a rotatable, spoke-type, handwheel for effecting movement of a valve member between open and closed positions, which comprises a portable, powered, valve operator having a lever arm; at one end of said arm a rotatable ring gear lying in a plane aligned with the plane of said lever arm and comprising a retaining slot; means for housing said gear and for retaining the same in position at the end of said arm; a power unit including means for rotating said ring gear; and a rotatable cylinder with its axis in alignment with the axis of said ring gear, with one end of said cylinder inside the ring gear, which end comprises a ring member adjacent said ring gear, a lug member adjacent to said ring member and projecting into said retaining slot, and means for clamping said cylinder to said ring gear, and with the opposite end of said cylinder comprising rod members, each one of which is in a plane of said axis, which are peripherally spaced apart equidistantly from one another and which function to transmit torque from said cylinder to said handwheel.

2. An apparatus according to claim 1, which comprises a plate with receptacles into which said rod members extend and fit, and means for clamping said plate to the spokes of said handwheel.

References Cited in the file of this patent

UNITED STATES PATENTS

| | | |
|---|---|---|
| 1,047,801 | Haney | Dec. 17, 1912 |
| 1,384,811 | Strand | July 19, 1921 |
| 1,852,776 | Hodeaux | Apr. 5, 1932 |
| 2,041,948 | Portain | May 26, 1936 |
| 2,709,062 | Lamb | May 24, 1955 |
| 2,770,820 | Wiegel et al. | Nov. 20, 1956 |